United States Patent
Tu et al.

(10) Patent No.: US 8,126,711 B2
(45) Date of Patent: Feb. 28, 2012

(54) METHOD AND MODULE FOR MODIFYING SPEECH MODEL BY DIFFERENT SPEECH SEQUENCE

(75) Inventors: Jia-Jang Tu, Hsinchu (TW); Yuan-Fu Liao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1055 days.

(21) Appl. No.: 11/971,917

(22) Filed: Jan. 10, 2008

(65) Prior Publication Data

US 2009/0132249 A1    May 21, 2009

(30) Foreign Application Priority Data

Nov. 21, 2007 (TW) ................................. 96144116 A (51) Int. Cl.
    *G10L 15/00* (2006.01)
(52) U.S. Cl. ....................................................... 704/243
(58) Field of Classification Search .................... 704/243
    See application file for complete search history.

(56) References Cited

U.S. PATENT DOCUMENTS

| | | | |
|---|---|---|---|
| 5,579,436 A | 11/1996 | Chou et al. | |
| 5,606,644 A | 2/1997 | Chou et al. | |
| 2005/0010393 A1 | 1/2005 | Danieli et al. | |

FOREIGN PATENT DOCUMENTS

| | | |
|---|---|---|
| CN | 1249480 | 4/2000 |
| EP | 0255523 B1 | 8/1994 |
| TW | 308666 | 6/1997 |
| TW | 200421262 | 10/2004 |
| TW | 200421263 | 10/2004 |
| TW | 200425063 | 11/2004 |
| TW | 200518041 | 6/2005 |
| WO | 03038809 | 5/2003 |

OTHER PUBLICATIONS

"Office Action of Taiwan Counterpart Application", issued on Dec. 28, 2011, p1-p4, in which the listed references were cited.

*Primary Examiner* — Susan McFadden
(74) *Attorney, Agent, or Firm* — Jianq Chyun IP Office (57) ABSTRACT

A modifying method for a speech model and a modifying module thereof are provided. The modifying method is as follows. First, a correct sequence of a speech is generated according to a correct sequence generating method and the speech model. Next, a candidate sequence generating method is selected from a plurality of candidate sequence generating methods, and a candidate sequence of the speech is generated according to the selected candidate sequence generating method and the speech model. Finally, the speech model is modified according to the correct sequence and the candidate sequence. Therefore, the present invention increases a discrimination of the speech model.

11 Claims, 6 Drawing Sheets

METHOD AND MODULE FOR MODIFYING SPEECH MODEL BY DIFFERENT SPEECH SEQUENCE

CROSS-REFERENCE TO RELATED APPLICATION

This application claims the priority benefit of Taiwan application serial no. 96144116, filed on Nov. 21, 2007. The entirety of the above-mentioned patent application is hereby incorporated by reference herein and made a part of this specification.

BACKGROUND OF THE INVENTION

1. Field of the Invention

The present invention relates to a speech recognition technique. More particularly, the present invention relates to a modifying method for a speech model.

2. Description of Related Art

With development of speech recognition technique, various electronic devices such as television, audio devices etc. may be operated via speeches. A user may operate these electronic devices via recognizable speech instructions of a speech recognition system. Besides applying to the electronic devices, the speech recognition technique is widely applied in related realms such as speech input, identity recognition etc.

Errors occurred to the speech recognition system includes substitution error, deletion error and insertion error. Referring to table 1, if the speeches of the user are respectively "A, B, C", and a recognition result of the speech recognition system is "D, B, C", such error is referred to as the substitution error. If the speeches of the user are respectively "A, B, C", and the recognition result of the speech recognition system is "A, C", such error is referred to as the deletion error. If the speeches of the user are respectively "A, B, C", and the recognition result of the speech recognition system is "A, B, C, D", such error is referred to as the insertion error.

TABLE 1

Types of recognition errors

| Substitution error | Correct answer | A | B | C | |
| --- | --- | --- | --- | --- | --- |
| | Recognition result | D | B | C | |
| Deletion error | Correct answer | A | B | C | |
| | Recognition result | A | | C | |
| Insertion error | Correct answer | A | B | C | |
| | Recognition result | A | B | C | D |

To solve the recognition errors, a representative speech model should be applied by the speech recognition system for comparing with the speeches of the user, so as to correctly recognize the speeches of the user. To obtain the representative speech model, a speech database may provide a large amount of speeches to the speech recognition system for modifying (or training) the speech model, wherein the large amount of speeches is a collection of speeches of a plurality of people, so as to improve a maximum likelihood of the speech model. Then, a discriminative training is applied for modifying the speech model to improve a discrimination of the speech model. Since the discrimination of the speech model greatly relates to a recognition rate of the speech recognition system, if the discrimination of the speech model is improved, the recognition rate of the speech recognition system then may be improved.

Presently, a preferred and a commonly used modifying method for the speech model is to modify the speech model based on a sequence generated by a fixed candidate sequence generator, for example, the modifying methods disclosed by U.S. Pat. No. 5,606,644 and U.S. Pat. No. 5,579,436. However, the fixed candidate sequence generator may easily cause an uneven distribution of the error types of the generated sequences. Therefore, the speech model obtained by a conventional training method is not desirable. Detailed description will be made with reference of FIG. 1.

Figure 1:
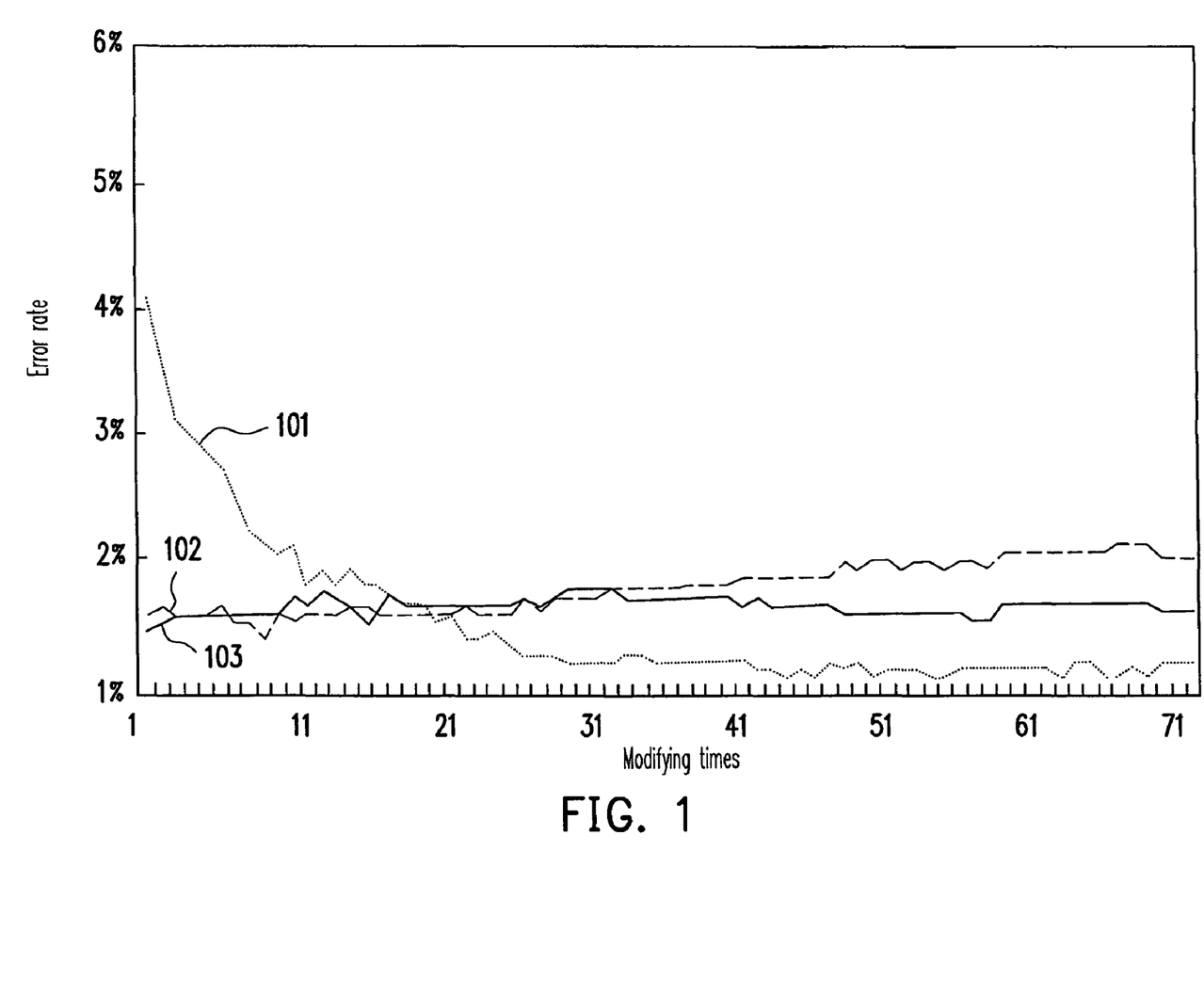
FIG. 1 is a curve diagram illustrating a training process of a speech model according to sequences with insertion errors generated by a conventional fixed sequence generator.

FIG. 1 is a curve diagram illustrating a training process of a speech model according to sequences with insertion errors generated by a conventional fixed sequence generator. Table 2 are experimental data of a speech model modified by sequences with insertion errors and generated by the conventional fixed sequence generator. Referring to FIG. 1 and table 2, curves 101, 102 and 103 are respectively error rate curves of the insertion error, the substitution error and the deletion error. When modifying times of the speech model reaches 20, the curves 101, 102 and 103 are convergent. According to the table 2, it is obvious that the conventional technique may effectively reduce the insertion error rate. However, the convention technique cannot reduce the substitution error rate, and even may worsen the deletion error rate.

TABLE 2

Experimental data of a speech model modified by sequences with insertion errors and generated by the conventional fixed sequence generator.

| | Insertion error rate | Deletion error rate | Distribution error rate | Digit accuracy | Sentence accuracy |
| --- | --- | --- | --- | --- | --- |
| Baseline | 4.06 | 1.52 | 1.64 | 92.79 | 74.67 |
| Conventional technique | 1.33 | 1.70 | 1.64 | 95.33 | 79.67 |
| Error reduction rate | 67.24 | −11.84 | 0.00 | 35.23 | 19.74 |

In summary, in the conventional technique, the signal fixed sequence generator is used for generating the sequences to modify the speech model. Since distribution of the error types of the generated sequences is uneven, only the error rate of a part of the error types is reduced, and meanwhile the error rates of the other part of the error types are worsened.

SUMMARY OF THE INVENTION

The present invention is directed to a modifying method for a speech model, so as to increase a discrimination of the speech model.

The present invention is directed to a modifying module for a speech model, so as to increase a recognition rate of the speech recognition.

The present invention provides a modifying method for a speech model. In the modifying method, a correct sequence of a speech is generated according to a correct sequence generating method and the speech model. One of a plurality of candidate sequence generating methods is selected according to a selection sequence, and a candidate sequence of the speech is generated according to the selected candidate sequence generating method and the speech model. In addition, the speech model is modified according to the correct sequence and the candidate sequence of the speech model.

According to another aspect of the present invention, a modifying module for a speech model is provided. The modifying module includes a speech database, a correct sequence generator, a candidate sequence module and a speech model modifier. The speech database is used for providing speeches. The correct sequence generator is coupled to the speech database and generates a correct sequence of a speech according to the speech model. The candidate sequence module is coupled to the speech database and includes a plurality of candidate sequence generators. The candidate sequence module may select a first candidate sequence generator from the plurality of candidate sequence generators according to a selection sequence, and the first candidate sequence generator may generate a candidate sequence of the speech according to the speech model. The speech model modifier is coupled to the correct sequence generator and the candidate sequence module, and modifies the speech model according to the correct sequence and candidate sequence of the speech.

In the present invention, the correct sequence of the speech is generated according to the correct sequence generator and the speech model. Moreover, one of the plurality of candidate sequence generating methods is selected according to the selection sequence, and the candidate sequence of the speech is generated according to the selected candidate sequence generating method and the speech model. In addition, the speech model is modified according to the correct sequence and the candidate sequence of the speech. By such means, the discrimination of the speech model is improved.

In order to make the aforementioned and other objects, features and advantages of the present invention comprehensible, a preferred embodiment accompanied with figures is described in detail below.

DESCRIPTION OF EMBODIMENTS

In the conventional technique, a fixed sequence generator generates a sequence with a specific error type for modifying a speech model, by which only an error rate of the specific error type may be reduced, and reduction of the error rates of the other error types cannot be achieved.

Accordingly, in the embodiments of the present invention, candidate sequences with different error types are generated according to different candidate sequence generating methods by applying a plurality of candidate sequence generators, so as to substitute the conventional fixed candidate sequence generator. By alternately utilizing the plurality of candidate sequence generators, the speech model may be modified by candidate sequences with different error types. Therefore, the uneven distribution of the error types of the conventional candidate sequences may be mitigated to improve the modification deviation of the speech mode.

Figure 2:
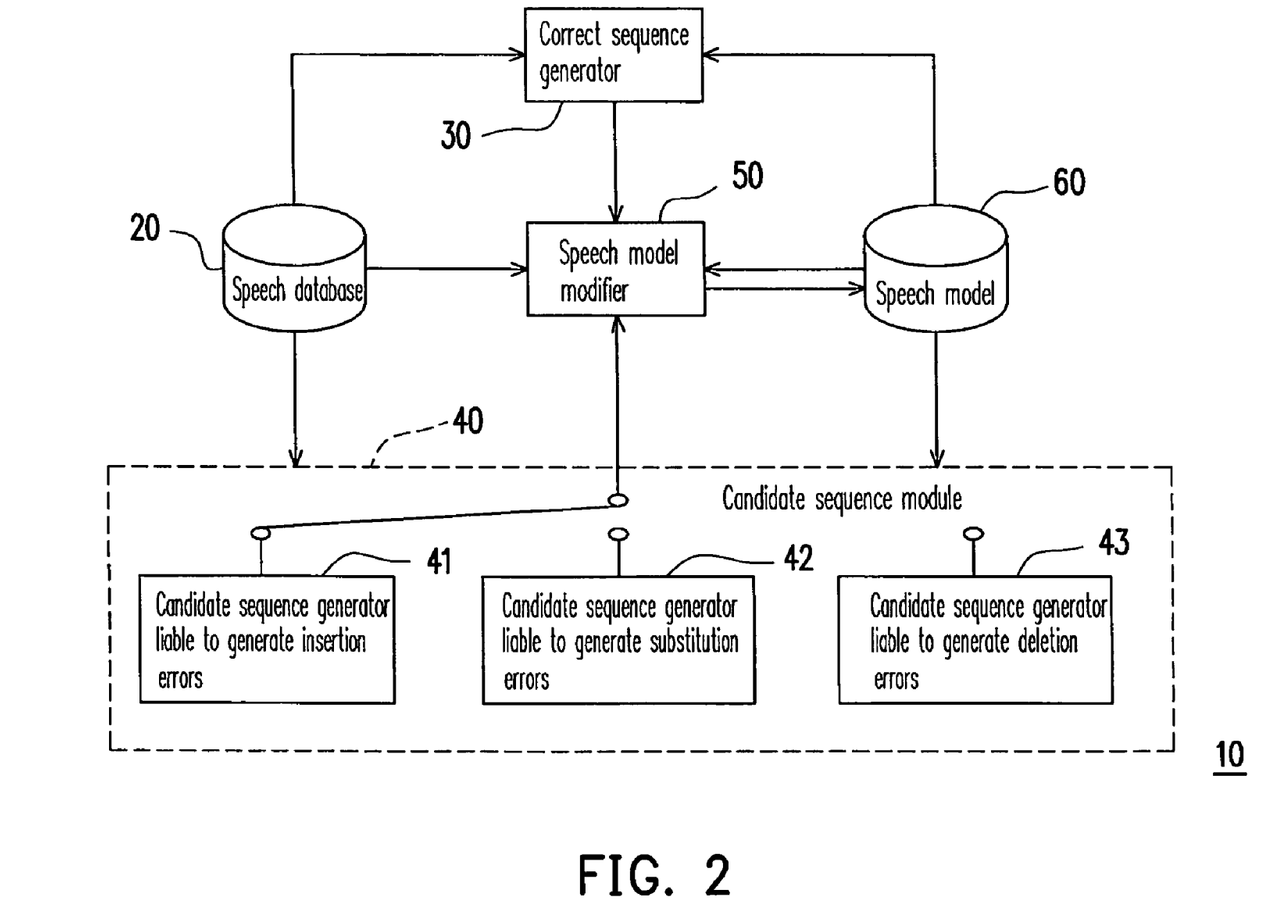
FIG. 2 is a schematic diagram of a modifying module for a speech model according to an embodiment of the present invention.

FIG. 2 is a schematic diagram of a modifying module for a speech model according to an embodiment of the present invention. Referring to FIG. 2, the modifying module 10 includes a speech database 20, a correct sequence generator 30, a candidate sequence module 40 and a speech model modifier 50. The speech database 20 is used for providing speeches. The correct sequence generator 30 is coupled to the speech database 20 and may generate a correct sequence of a speech according to a speech model 60. The candidate sequence module 40 is coupled to the speech database 20 and includes a plurality of candidate sequence generators.

The candidate sequence module 40 may select a candidate sequence generator from the plurality of candidate sequence generators according to a selection sequence SS, and the selected candidate sequence generator may generate a candidate sequence of the speech according to the speech model 60. The speech model modifier 50 is coupled to the correct sequence generator 30 and the candidate sequence module 40, and modifies the speech model 60 according to the correct sequence and candidate sequence of the speech.

In the present embodiment, the plurality of candidate sequence generators is respectively represented by candidate sequence generators 41, 42 and 43. The candidate sequence generator 41 applies a candidate sequence generating method liable to generate a candidate sequence with an insertion error, and therefore the candidate sequence generator 41 is liable to generate the candidate sequence with the insertion error. The candidate sequence generator 42 applies a candidate sequence generating method liable to generate a candidate sequence with a substitution error, and therefore the candidate sequence generator 42 is liable to generate the candidate sequence with the substitution error. The candidate sequence generator 43 applies a candidate sequence generating method liable to generate a candidate sequence with a deletion error, and therefore the candidate sequence generator 43 is liable to generate the candidate sequence with the deletion error. The candidate sequence generators 41, 42 and 43 and the candidate sequence generating methods thereof will be described in detail below.

Generally, a speech recognition device may recognize the speech via two recognition networks respectively with a fixed length and a non-fixed length. Taking recognition of a Chinese numeric string as an example, staff numbers or document numbers generally have the fixed lengths, and therefore the recognition network with the fixed length may be applied for recognizing. If a content to be recognized has the non-fixed length, the recognition network with the non-fixed length may be applied for recognizing. In the present embodiment, speeches within the speech database 20 are all known, and accordingly lengths of the speeches are known. Therefore, based on such information, candidate sequence generators with different candidate sequence generating methods may be designed according to the two recognition networks with the fixed length and the non-fixed length.

To be specific, the candidate sequence generator 41 applies a speech recognition device liable to generate the insertion errors, which may perform recognition based on the recognition network with the non-fixed length, and selects the candidate sequence with a length being greater than that of a correct answer, so as to generate relatively more insertion errors. The candidate sequence generator 42 applies a speech recognition device liable to generate the substitution errors, which may perform recognition based on the recognition network with the fixed length to obtain the candidate sequence with the length equals to that of the correct answer, so as to generate relatively more substitution errors. The candidate sequence generator 43 applies a speech recognition device liable to generate the deletion errors, which may perform recognition based on the recognition network with the non-fixed length, and selects the candidate sequence with a length being less than that of a correct answer, so as to generate relatively more deletion errors.

On the other hand, the selection sequence SS may be an alternate arrangement of the candidate sequence generators 41, 42 and 43, as shown in table 3.

TABLE 3

Selection sequence

| Sequence number | Candidate sequence generators selected by the candidate sequence module 40 |
|---|---|
| 1 | Candidate sequence generator 41 |
| 2 | Candidate sequence generator 42 |
| 3 | Candidate sequence generator 41 |
| 4 | Candidate sequence generator 42 |
| 5 | Candidate sequence generator 43 |

Figure 3:
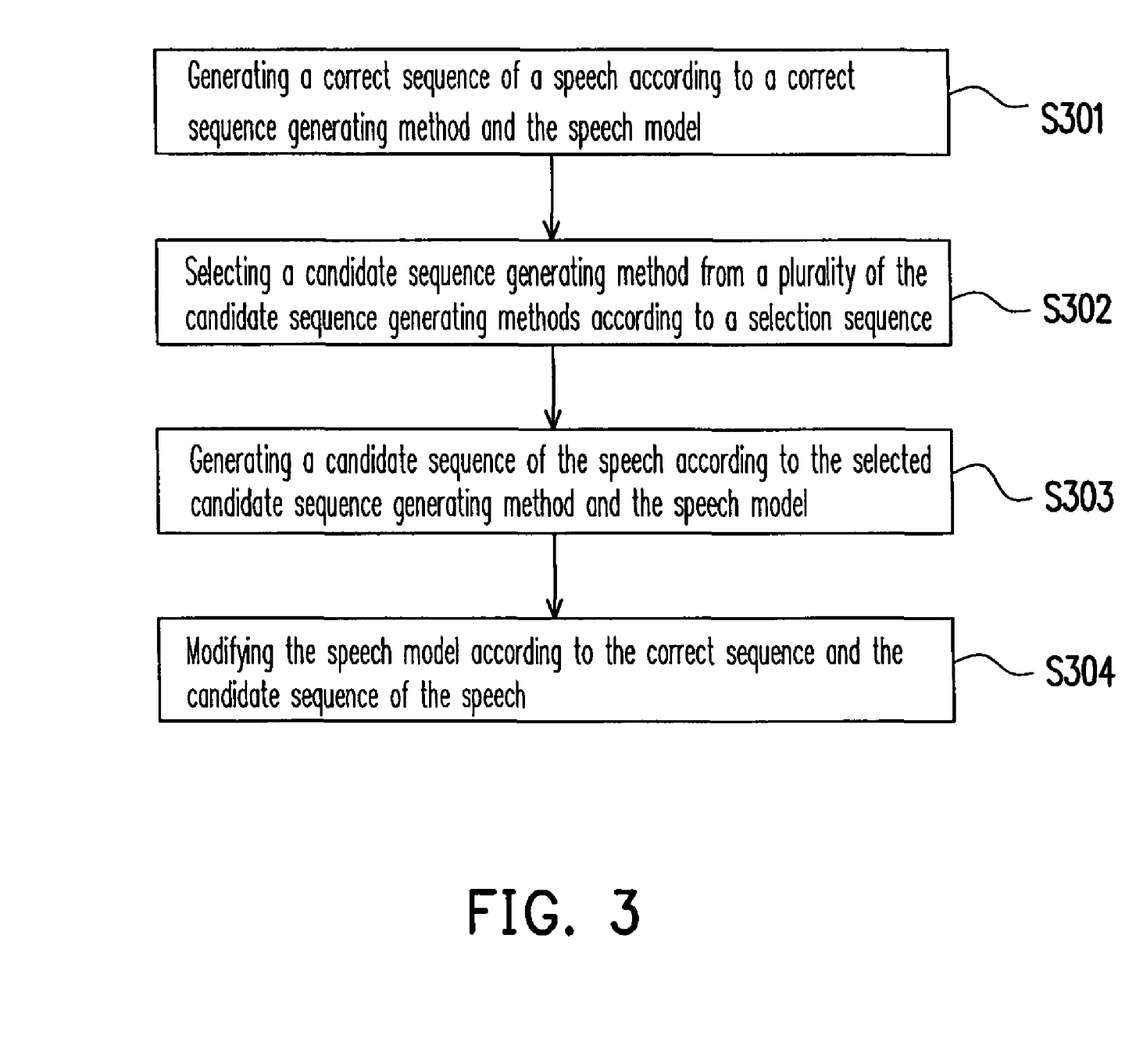
FIG. 3 is a flowchart illustrating a modifying method for a speech model according to an embodiment of the present invention.

FIG. 3 is a flowchart illustrating a modifying method for a speech model according to an embodiment of the present invention. Referring to FIG. 2 and FIG. 3, a first speech is provided by the speech database 20 for the speech model modifier 50 to perform a first modification to the speech model 60. First, in step S301, the correct sequence generator 30 generates a correct sequence of the first speech according to the correct sequence generating method and the speech model 60. Next, in step S302, the candidate sequence module 40 selects a candidate sequence generator from the plurality of candidate sequence generators according to the selection sequence SS. According to the table 3, the candidate sequence module 40 of the present embodiment may select the candidate sequence generator 41 with a sequence number of "1". Next, in step S303, the candidate sequence generator 41 generates the candidate sequence of the first speech based on the candidate sequence generating method liable to generate the insertion errors. Next, in step S304, the speech model modifier 50 modifies the speech model 60 according to the correct sequence and the candidate sequence of the first speech.

When a second speech is provided by the speech database 20 for the speech model modifier 50 to perform a second modification to the speech model 60, the correct sequence generator 30 may provide the correct sequence of the second speech to the speech model modifier 50 (step S301). The candidate sequence module 40 then selects the candidate sequence generator 42 with the sequence number of "2" according to the selection sequence SS (step S302), so as to generate the candidate sequence of the second speech for the speech model modifier 50 (step S303). Next, the speech model modifier 50 modifies the speech model 60 according to the correct sequence and the candidate sequence of the second speech (step S304).

Deduced by analogy, when the speech database 20 provides a third speech for the speech model modifier 50 to perform a third modification to the speech model 60, the candidate sequence module 40 then selects the candidate sequence generator 41 with the sequence number of "3" according to the selection sequence SS. When the speech database 20 provides a fourth speech for the speech model modifier 50 to perform a fourth modification to the speech model 60, the candidate sequence module 40 then selects the candidate sequence generator 42 with the sequence number of "4" according to the selection sequence SS.

When the speech database 20 provides a fifth speech for the speech model modifier 50 to perform a fifth modification to the speech model 60, the candidate sequence module 40 then selects the candidate sequence generator 43 with the sequence number of "5" according to the selection sequence SS. When the speech database 20 provides a sixth speech for the speech model modifier 50 to perform a sixth modification to the speech model 60, the candidate sequence module 40 then again selects the candidate sequence generator 41 with the sequence number of "1" according to the selection sequence SS. An embodiment is provided below to explain how the candidate sequence module 40 selects one of the plurality of candidate sequence generators (step S302).

First, a counter (not shown) may be set to the candidate sequence module 40, this counter may count a number of times that the candidate sequence 40 selects the candidate sequence generator. Assuming an initial counting value of the counter is "1", each time the candidate sequence module 40 selects one of the plurality of candidate sequence generators, the counting value adds 1. By such means, the candidate sequence module 40 may implement the selection sequence SS shown in the table 3 according to the counting value.

Figure 4:
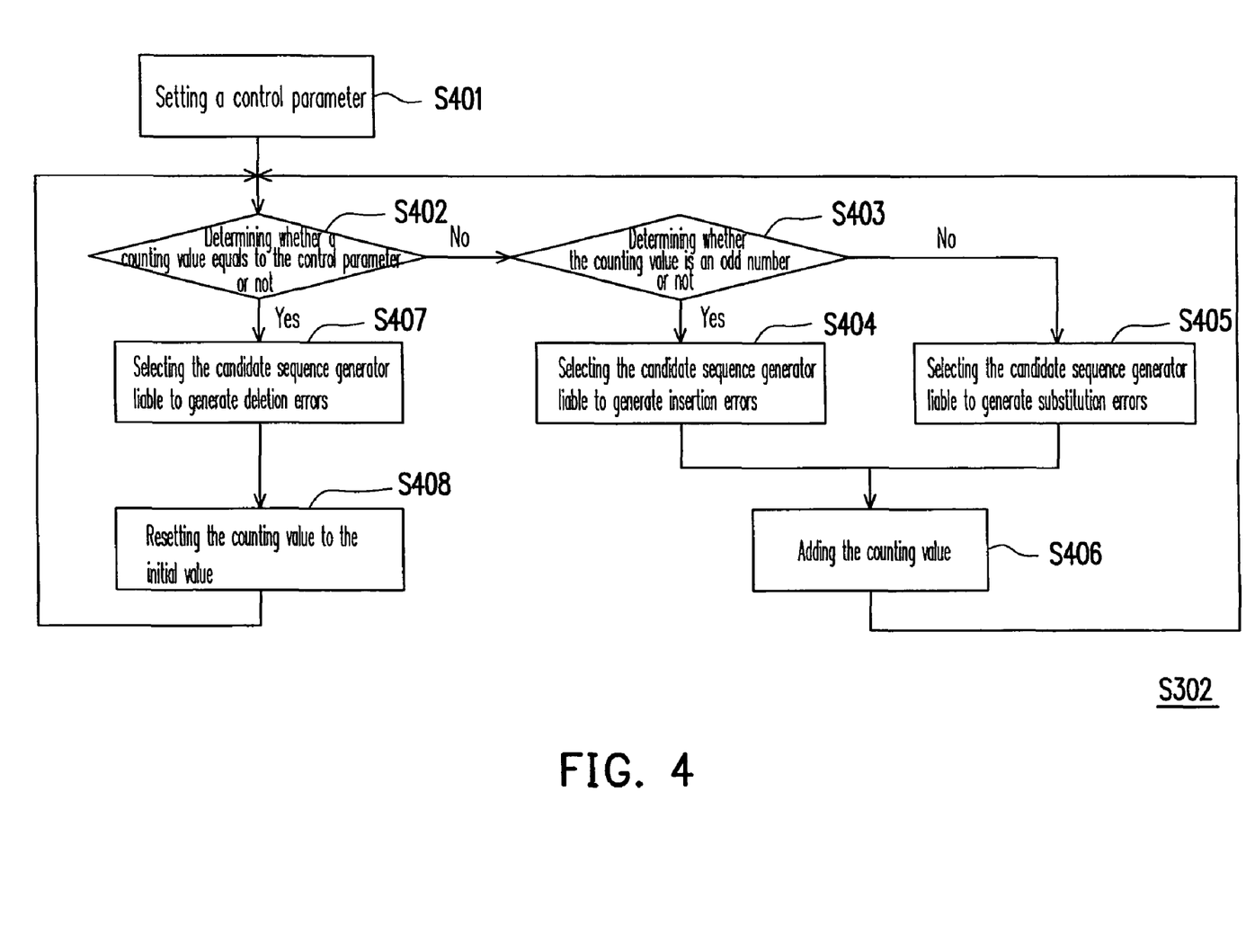
FIG. 4 is a flowchart illustrating a method for selecting a candidate sequence generator according to an embodiment of the present invention.

For example, FIG. 4 is a flowchart illustrating a method for selecting a candidate sequence generator according to an embodiment of the present invention. Referring to FIG. 2 and FIG. 4, first, in step S401, a control parameter is set by the candidate sequence module 40, and in the present embodiment, the control parameter is set to 5. Next, in step S402, the counting value is determined whether or not to be equal to the control parameter, and if the counting value is not equal to the control parameter, step S403 is then executed. Conversely, if the counting value is equal to the control parameter, step 407 is then executed. During the first modification of the speech model 60, the initial counting value "1" is not equal to the control parameter "5", and therefore the step S403 is executed, in which the counting value is determined whether or not to be an odd number, and if the counting value is an odd number, step S404 is then executed; conversely, if the counting value is not an odd number, step S405 is then executed. Since the counting value "1" is the odd number, the step S404 is executed, by which the candidate sequence generator 41 is selected. Next, the counting value adds 1 (step S406) and the step S402 is then repeated.

Accordingly, during the second modification of the speech model 60, the counting value is "2", and then the steps S402, S403 and S405 are sequentially executed to select the candidate sequence generator 42. Next, the counting value adds 1 (step S406), and the step S402 is then repeated. During the third modification of the speech model 60, the counting value is "3", and then the steps S402, S403 and S404 are sequentially executed to select the candidate sequence generator 41. Next, the counting value adds 1 (step S406), and the step S402 is then repeated. During the fourth modification of the speech model 60, the counting value is "4", and then the steps S402, S403 and S404 are sequentially executed to select the candidate sequence generator 42. Next, the counting value adds 1 (step S406), and the step S402 is then repeated.

Accordingly, during the fifth modification of the speech model 60, the counting value is "5", and then the steps S402 and S407 are sequentially executed to select the candidate sequence generator 43. Next, the counting value is set to "1" again (step S408), and the step S402 is then repeated. During the sixth modification of the speech model 60, the counting value is "1", and then the steps S402, S403 and S404 are sequentially executed to select the candidate sequence generator 41. Next, the counting value adds 1 (step S406), and the step S402 is then repeated. Deduced by analogy, and the repeated description is omitted hereby. Next, the step S304 is further described in detail.

Figure 5:
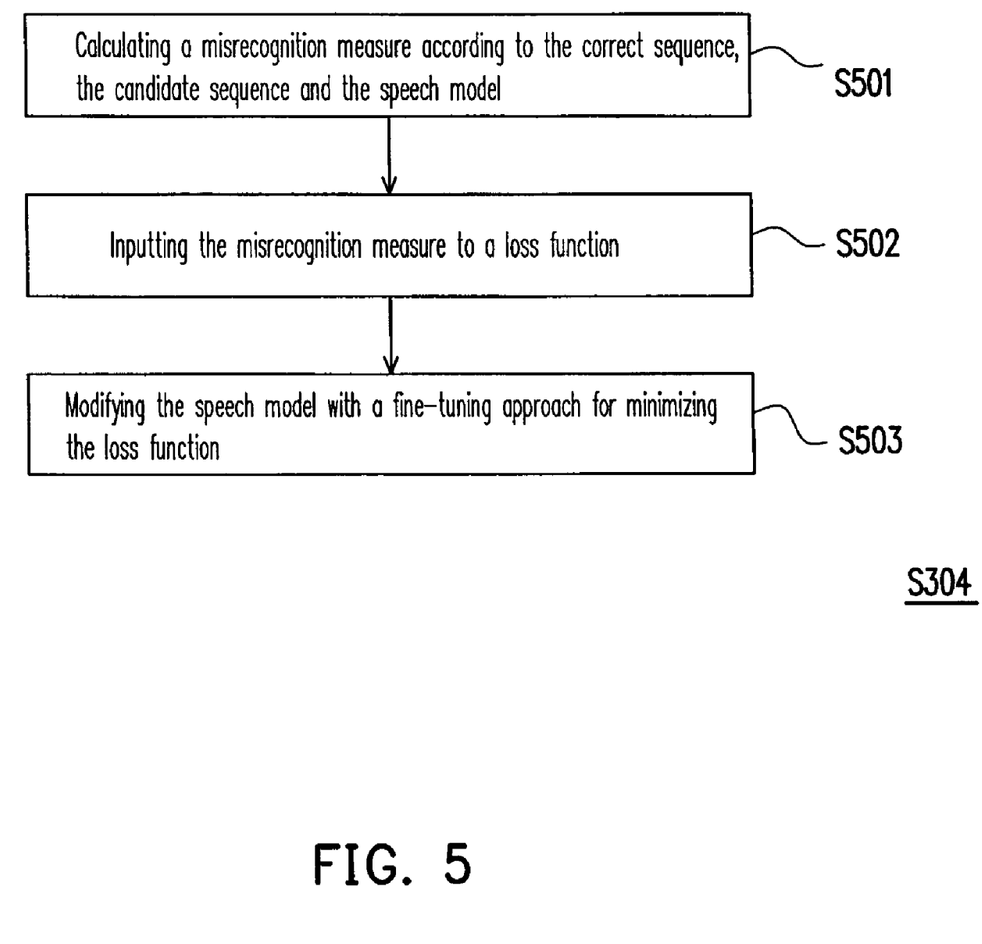
FIG. 5 is a flowchart illustrating steps of modifying a speech model according to a correct sequence and a candidate sequence of a speech.

FIG. 5 is a flowchart illustrating steps of modifying a speech model according to a correct sequence and a candidate sequence of a speech. Referring to FIG. 2 and FIG. 5, first, in step S501, a misrecognition measure is calculated by the speech model modifier 50 according to the correct sequence, the candidate sequence and the speech model 60. Next, in step S502, the misrecognition measure is input to a loss function. Next, the speech model modifier 50 modifies the speech model 60 with a fine-tuning approach to minimize the loss function, so as to improve the discrimination of the speech model 60.

To further explain the advantages of the embodiment of the present invention, a part of experimental data is provided to those skilled in the art for reference. In the present embodiment, experimental result for recognition of the Chinese numeral string is taken as an example. Training corpus of the Chinese numeral database includes 5080 sentences, and test corpus includes four groups, which respectively are MAT_TS, ITRI_ID, NTUT_CARD and NTUT_CONFUSION, wherein the MAT_TS has 757 sentences, the ITRI_ID has 1243 sentences, the NTUT_CARD has 475 sentences and the NTUT_CONFUSION has 3252 sentences. The speech model 60 applies 19 context independent phone models, and each model has 3 states, and 16 mixture per state. Moreover, a silence model including 3 states and a short silence model with one state are further trained.

Figure 6:
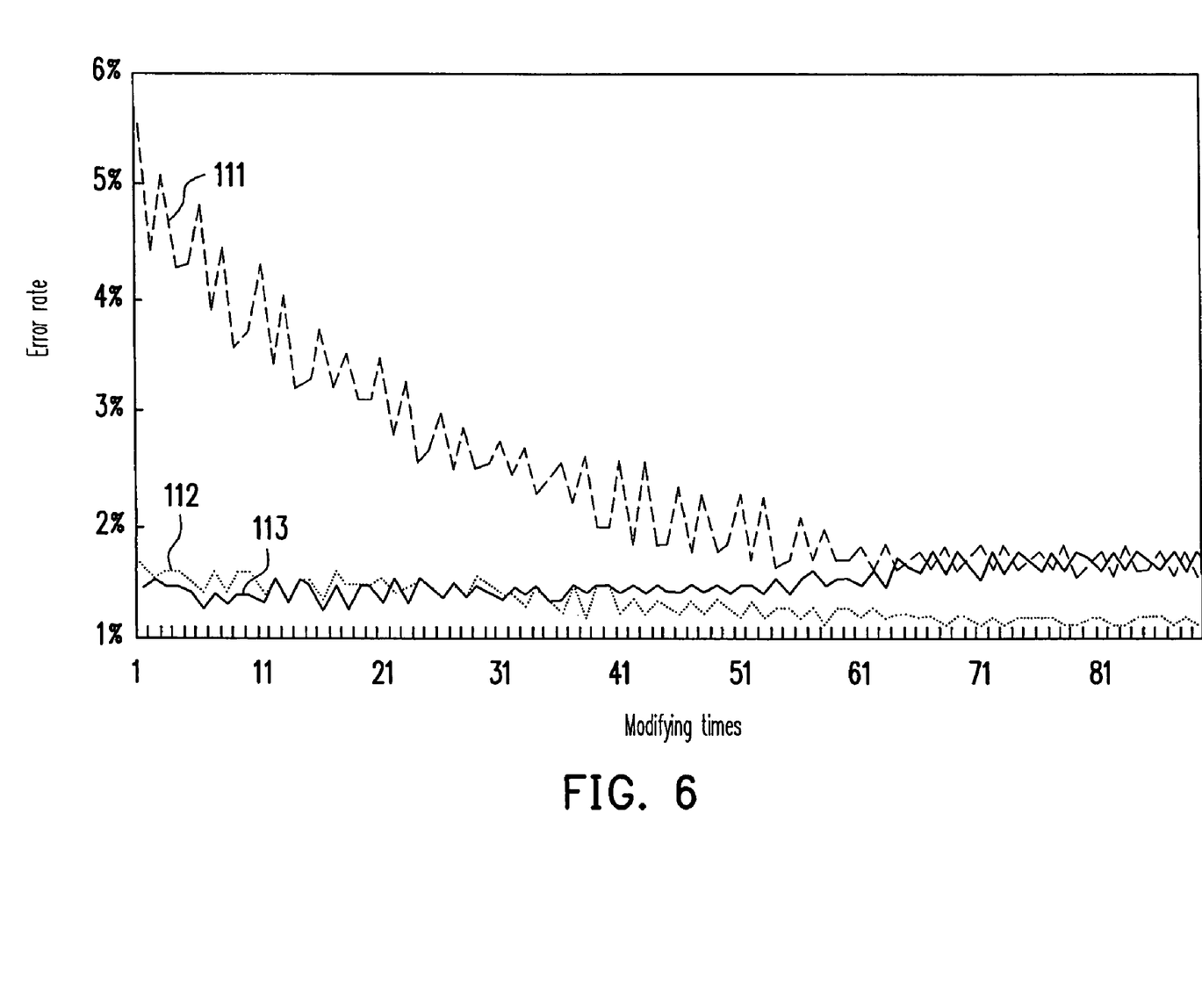
FIG. 6 is a curve diagram illustrating a modification process of a speech model.

FIG. 6 is a curve diagram illustrating a modification process of a speech model. Table 4 is a comparison table between experimental data of the present embodiment and that of the convention technique. Referring to FIG. 6 and table 4, curves 111, 112 and 113 are respectively error rate curves of the insertion error, the substitution error and the deletion error. When modification times of the speech model 60 reaches 62, the curves 111, 112 and 113 are convergent. Comparing to FIG. 1, it is obvious that the curve 111 of the insertion error has an obvious oscillation phenomenon, this is due to alternate utilization of the candidate sequences with different error features, such that different errors may be alternately modified, and therefore difference among occurrence rates of the three error types is obviously reduced.

Referring to table 4, it is obvious that for different test corpuses, the method of the present invention may not only greatly reduce the insertion error, the deletion error and the substitution error, but may also greatly improve the speech recognition rate. Comparing to a baseline system, sentence error rate of the conventional technique may be reduced 20%~36.6%, and digit error rate may be reduced 16.96%~39.85% according to the conventional technique, while according to the method of the present invention, the sentence error rate may be reduced 27.69%~41.74%, and the digit error rate may be reduced 30.94%~49.81%. Therefore, the method of the present invention may further reduce the error rate compared to the conventional technique.

TABLE 4

A comparison table between the experimental data of the present method and the conventional method

| Test corpus | Model | Insertion error rate | Deletion error rate | Substitution error rate | Digit accuracy | Sentence accuracy | Digit error reduction rate | Sentence error reduction rate |
| --- | --- | --- | --- | --- | --- | --- | --- | --- |
| MAT_TS | Baseline | 1.73 | 1.70 | 1.89 | 94.68 | 76.88 | | |
| | Conventional technique | 0.41 | 1.70 | 1.08 | 96.80 | 85.34 | 39.85 | 36.60 |
| | Present embodiment | 0.53 | 1.29 | 0.85 | 97.33 | 86.53 | 49.81 | 41.74 |
| ITRI_ID | Baseline | 1.19 | 2.55 | 1.98 | 94.27 | 72.73 | | |
| | Conventional technique | 0.17 | 2.40 | 1.60 | 95.83 | 81.17 | 27.23 | 30.95 |
| | Present embodiment | 0.25 | 1.96 | 1.45 | 96.34 | 81.74 | 36.13 | 33.04 |
| NTUT_CARD | Baseline | 1.76 | 1.74 | 2.22 | 94.28 | 45.26 | | |
| | Conventional technique | 0.61 | 2.10 | 2.05 | 95.25 | 56.21 | 16.96 | 20.00 |
| | Present embodiment | 0.74 | 1.48 | 1.72 | 96.05 | 60.42 | 30.94 | 27.69 |
| NTUT_CONFUSION | Baseline | 4.15 | 3.52 | 3.50 | 88.84 | 65.20 | | |
| | Conventional technique | 1.28 | 2.78 | 3.23 | 92.72 | 74.79 | 34.77 | 27.56 |
| | Present embodiment | 2.07 | 2.33 | 2.63 | 92.98 | 75.99 | 37.10 | 31.01 |

In summary, in the present embodiment, the candidate sequence module 40 selects the candidate sequence generator according to the selection sequence SS, so as to generate the candidate sequence with different error types. By such means, modification deviation of the speech model caused by applying the candidate sequence with the fixed error type provided by the conventional method may be mitigated. Therefore, the discrimination of the speech model 60 may be greatly improved, such that the recognition rate of the speech recognition is improved.

It should be noted that though a preferred modifying method for the speech model and a modifying module thereof are provided in the aforementioned embodiment, those skilled in the art should be understood that different manufacturers may have different designs of the modifying method and the modifying module for the speech model, and therefore the present invention is not limited to the preferred modifying method and the modifying module provided above. In other words, as long as the modifying method and the modifying module for the speech model may generate the candidate sequence with different error types according to the selection sequence, it is considered to be within the spirit and scope of the present invention. Now, the aforementioned steps will now be described more fully for fully conveying the concept of the invention to those skilled in the art.

Referring to FIG. 2 again, in the aforementioned embodiment, the selection sequence SS provided by the table 3 is only for a selection example, and the present invention is not limited thereto. In other words, those skilled in the art may set the selection sequence SS according to an actual requirement, so as to provide the candidate sequences with different error types. For example, the table 3 may be substitute by a table 5. Moreover, the selection sequence SS may also be an alternate arrangement of the candidate sequence generators 41 and 42, shown as table 6.

TABLE 5

Another selection sequence table

| Sequence number | Candidate sequence generator selected by the candidate sequence module 40 |
|---|---|
| 1 | Candidate sequence generator 42 |
| 2 | Candidate sequence generator 41 |
| 3 | Candidate sequence generator 42 |
| 4 | Candidate sequence generator 41 |
| 5 | Candidate sequence generator 43 |

TABLE 6

Still another selection sequence table

| Sequence number | Candidate sequence generator selected by the candidate sequence module 40 |
|---|---|
| 1 | Candidate sequence generator 41 |
| 2 | Candidate sequence generator 42 |

Moreover, in FIG. 2, though only the candidate sequence generators 41~43 are provided for representing the plurality of candidate sequence generators of the candidate sequence module 40. However, in another embodiment, number of the candidate sequence generators may be varied, and even the candidate sequence generators of other types may be applied.

On the other hand, in the embodiment of FIG. 4, the control parameter is "5", however, the present invention is not limited thereto. Those skilled in the art may set the control parameter according to the selection sequence by themselves, or even change the steps of FIG. 4.

In summary, according to the modifying method for the speech model of the present invention, different candidate sequence generating methods may be selected according to the selection sequence, so as to generate the candidate sequences with different error types. Therefore, modification deviation of the speech model caused by applying the candidate sequence with the fixed error type provided by the conventional method may be mitigated. Therefore, the discrimination of the speech model may be greatly improved and the recognition rate of the speech recognition is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A modifying method for a speech model comprising:
generating a correct sequence of a first speech by a correct sequence generator according to a correct sequence generating method and the speech model, wherein the first speech received from a speech database;
selecting a first candidate sequence generating method from a plurality of the candidate sequence generating methods by a candidate sequence module according to a selection sequence, wherein each of the candidate sequence generating methods liable to generate a candidate sequence having at least one error;
generating a candidate sequence of the first speech by a first candidate sequence generator according to the first candidate sequence generating method and the speech model; and
modifying the speech model by a speech model modifier according to the correct sequence and the candidate sequence of the first speech.

2. The modifying method for a speech model as claimed in claim 1 further comprising:
receiving a second speech from the speech database;
generating a correct sequence of the second speech according to the correct sequence generating method and the speech model;
selecting a second candidate sequence generating method from a plurality of the candidate sequence generating methods according to the selection sequence;
generating a candidate sequence of the second speech according to the second candidate sequence generating method and the speech model; and
modifying the speech model according to the correct sequence and the candidate sequence of the second speech.

3. The modifying method for a speech model as claimed in claim 1, wherein the step of selecting the first candidate sequence generating method from a plurality of the candidate sequence generating methods according to the selection sequence further comprises:
setting a control parameter; and
selecting the first candidate sequence generating method from a plurality of the candidate sequence generating methods according to the control parameter, and modifying the control parameter.

4. The modifying method for a speech model as claimed in claim 1, wherein the step of modifying the speech model according to the correct sequence and the candidate sequence of the first speech further comprises:
calculating a misrecognition measure according to the speech model and the correct sequence and the candidate sequence of the first speech;
inputting the misrecognition measure to a loss function; and
modifying the speech model with a fine-tuning approach for minimizing the loss function.

5. The modifying method for a speech model as claimed in claim 1, wherein a plurality of the candidate sequence generating methods comprise two candidate sequence generating methods, the selection sequence is an alternate arrangement of the two candidate sequence generating methods.

6. The modifying method for a speech model as claimed in claim 1, wherein a plurality of the candidate sequence generating methods comprise three candidate sequence generating methods, the selection sequence is an alternate arrangement of the three candidate sequence generating methods.

7. The modifying method for a speech model as claimed in claim 1, wherein the candidate sequence generating methods comprise a candidate sequence generating method liable to generate insertion errors, a candidate sequence generating method liable to generate substitution errors and a candidate sequence generating method liable to generate deletion errors.

8. A modifying module for a speech model, connected to an electronic device, comprising:
- a speech database, for providing a speech;
- a correct sequence generator, coupled to the speech database for generating a correct sequence of the speech according to the speech model;
- a candidate sequence module, coupled to the speech database, comprising a plurality of candidate sequence generators, each of the candidate sequence generators liable to generate a candidate sequence having at least one error, and the candidate sequence module selecting a first candidate sequence generator from the candidate sequence generators according to a selection sequence, wherein the first candidate sequence generator generates a candidate sequence of the speech according to the speech model; and
- a speech model modifier, coupled to the correct sequence generator and the candidate sequence module for modifying the speech model according to the correct sequence and the candidate sequence of the speech.

9. The modifying module for a speech model as claimed in claim 8, wherein the candidate sequence generators comprise the first candidate sequence generator, a second candidate sequence generator and a third candidate sequence generator, wherein the first candidate sequence generator is liable to generate a candidate sequence with an insertion error, the second candidate sequence generator is liable to generate a candidate sequence with a substitution error, and the third candidate sequence generator is liable to generate a candidate sequence with a deletion error.

10. The modifying module for a speech model as claimed in claim 8, wherein the candidate sequence generators comprise two candidate sequence generators, wherein the selection sequence is an alternate arrangement of the two candidate sequence generators.

11. The modifying module for a speech model as claimed in claim 8, wherein the candidate sequence generators comprise three candidate sequence generators, and the selection sequence is an alternate arrangement of the three candidate sequence generators.

* * * * *